United States Patent Office 3,396,186
Patented Aug. 6, 1968

3,396,186
BORON ACID ESTER OF PHENONE
Henryk A. Cyba, Evanston, Ill., assignor to Universal Oil Products Company, Des Plaines, Ill., a corporation of Delaware
No Drawing. Filed May 25, 1965, Ser. No. 458,785
8 Claims. (Cl. 260—462)

ABSTRACT OF THE DISCLOSURE

Boron esters of 2-hydroxybenzophenones suitable for use as additives in organic substrates such as plastics, gasoline, lubricating oils and greases.

---

This invention relates to a novel composition of matter and to the use thereof as an additive in organic substrates.

A preferred novel composition of matter is a borate of a hydroxyphenone and, more particularly, a borate of a hydroxyphenone of the following general formula:

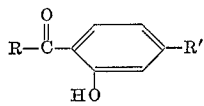

where R is selected from the group consisting of aryl, alkyl and cycloalkyl and R' is selected from the group consisting of hydrogen, alkyl, cycloalkyl, hydroxy, alkoxy, monocyclic aryloxy and cycloalkoxy.

Where R is aryl the novel compound is a borate of hydroxybenzophenone. It is understood that the hydroxybenzophenone may contain one or a plurality of hydroxy groups and, in fact, a particularly preferred hydroxybenzophenone is 2,2'-dihydroxybenzophenone. Other hydroxybenzophenones include 2-hydroxybenzophenone,
2,3-dihydroxybenzophenone,
2,5-dihydroxybenzophenone,
2,6-dihydroxybenzophenone,
2,3,5 trihydroxybenzophenone,
2,3,5,6-tetrahydroxybenzophenone,
2,2',3,3'-tetrahydroxybenzophenone,
2,2',4,4'-tetrahydroxybenzophenone,
2,2',5,5'-tetrahydroxybenzophenone and
2,2',6,6'-tetrahydroxybenzophenone.

Where R in the above formula is aryl and R' is a substituent selected from those hereinbefore set forth, illustrative but not limiting examples of hydroxybenzophenones for use as a reactant in preparing the borate include 2-hydroxy-4-alkylbenzophenone in which the alkyl contains from one to 30 carbon atoms and preferably from one to 18 carbon atoms and thus is selected from methyl, ethyl, propyl, butyl, pentyl, hexyl, heptyl, octyl, nonyl, decyl, undecyl, dodecyl, etc., 2-hydroxy-4-cycloalkylbenzophenone in which the cycloalkyl contains from 3 to 12 carbon atoms in the cycloalkyl ring and preferably is cyclohexyl but may be cyclopropyl, cyclobutyl, cyclopentyl, cycloheptyl, cyclooctyl, cyclononyl, cyclodecyl, cycloundecyl or cyclododecyl, 2-hydroxy-4-alkoxybenzophenone in which the alkoxy group contains from 1 to 30 carbon atoms and preferably from 3 to 20 carbon atoms and thus is selected from propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy and eicosoxy, 2-hydroxy-4-aryloxybenzophenone in which the aryloxy group is selected from phenoxy, touloxy, xyloxy, etc., 2-hydroxy-4-cycloalkoxybenzophenone in which the cycloalkyl ring contains from 3 to 12 carbon atoms and is selected from cyclopropoxy, cyclobutoxy, cyclopentoxy, cyclohexoxy, cycloheptoxy, cyclooctoxy, cyclononoxy, cyclodecoxy, cycloundecoxy and cyclododecoxy, and similarly substituted cmpounds where two or more of the same or different groups selected from those set forth above are attached to one or both of the phenyl rings.

Where the hydroxybenzophenone contains a hydroxy group on each of the phenyl rings, the hydroxy groups preferably are in the positions of 2,2'-and accordingly a preferred hydroxyphenone for use in forming the borate is 2,2'-dihydroxybenzophenone. Illustrative but not limiting compounds for use in forming the borate in this embodiment of the invention include 2,2'-dihydroxy-4-alkylbenzophenone, 2,2' - dihydroxy - 4,4' - dialkylbenzophenone, 2,2'-dihydroxy-4-cycloalkylbenzophenone, 2,2'-dihydroxy - 4,4' - dicycloalkylbenzophenone, 2,2' - dihydroxy-4-alkoxybenzophenone, 2,2' - dihydroxy - 4,4' - dialkoxybenzophenone, 2,2' - dihydroxy - 4 - aryloxybenzophenone, 2,2' - dihydroxy - 4,4' - diaryloxybenzophenone, 2,2' - dihydroxy - 4 - cycloalkoxybenzophenone and 2,2'-dihydroxy - 4,4' - dicycloalkoxybenzophenone, in which these substituents are selected from those specifically hereinbefore set forth. Here again, it is understood that one or both of the phenyl rings may contain two or more of the same or different substituents selected from those set forth above.

Where R in the above formula is alkyl, illustrative hydroxyphenones include 2 - hydroxyacetophenone, 2-hydroxypropiophenone, 2 - hydroxybutyrophenone, 2-hydroxyvalerophenone, 2 - hydroxycaprylophenone, 2-hydroxylaurylphenone, 2 - hydroxypalmitylphenone, etc. Here again it is understood that the phenyl ring may contain one or more of the substituents hereinbefore set forth and also that the alkyl moiety may contain one or more substituents attached thereto, these substituents preferably being selected from those hereinbefore specifically set forth. Where R in the above formula is cycloalkyl, the cycloalkyl preferably is cyclohexyl or it may be cyclopropyl, cyclobutyl, cyclopentyl, cycloheptyl, cyclooctyl, cyclononyl, cyclodecyl, cycloundecyl, cyclododecyl, etc. Here again the cycloalkyl ring may contain one or more of the substituents hereinbefore set forth.

From the above description, it will be seen that various hydroxyphenones may be used in preparing the borate of the present invention. It is understood that the different hydroxyphenones will not necessarily react identically with the borylating agent but all of them will react to form desired borates.

As hereinbefore set forth the hydroxyphenone is reacted with a borylating agent to form the borate. Any suitable borylating agent may be used. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include boric oxide, boric acid complex, alkyl boric acid, dialkyl boric acid, cycloalkyl boric acid, dicycloalkyl boric acid, aryl boric acid, diaryl boric acid, alkylboronic acid, arylboronic acid, or substitution products of these with alkoxy, alkyl and/or halo groups.

The reaction of the borylating agent and the hydroxyphenone is effected in any suitable manner. The orthoborates are formed by heating and stirring the reactants at a temperature up to about 100° C. and thus within the range of from about 60° to about 100° C. when using boric acid. The meta-borates are formed at temperatures above about 100° C. and thus may be within the range of from about 100° to about 200° C. or more. The higher temperature of from about 100° to about 200° C. also is used when employing trialkyl borates in order to effect the transesterification reaction. In one method the reactants are refluxed in the presence of a solvent. Any suitable solvent may be used and advantageously comprises an aromatic hydrocarbon solvent including benzene, toluene, xylene, ethylbenzene, cumene, etc. Other solvents include n-hexane, n-heptane, n-octane, chlorinated hydrocarbons, etc., or mixtures thereof. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, toluene sulfonic acid, benzene sulfonic acid, various sulfonated ion exchange resins, solid phosphoric acid, polyphosphoric acid, sulfuric acid and in fact any suitable esterification or transesterification catalyst. The proportions of borylating agent and hydroxyphenone will be selected with reference to the number and position of hydroxy groups present in the hydroxyphenone and will be within the range of from about 0.5 to 4 and preferably from about 1 to about 3 mole proportions of borylating agent per one mole proportion of hydroxyphenone.

In another embodiment, an alcohol, including aliphatic or aromatic alcohol, or mercaptan, including aliphatic or aromatic mercaptan, is included in the reaction charge to satisfy one or two of the valences of the boron. When used, the alcohol or mercaptan is employed in an amount of from about 1 to 2 mole proportions thereof per 1 mole proportion thereof per 1 mole proportion of the hydroxyphenone. Preferred aliphatic alcohols include methanol, isopropanol, n-butanol, sec-butyl alcohol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, etc. Preferred aromatic alcohols include phenol, cresol, xylenol, etc. The aliphatic or aromatic alcohol may be substituted with alkoxy groups or thioalkoxy groups. Preferred mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

The temperature of the refluxing will depend upon the particular solvent employed. For example, with benzene as the solvent, the temperature will be of the order of 80° C. When using toluene, the temperature will be of the order of 110° C. When using xylene, the temperature will be of the order of 140° C.

As hereinbefore set forth, the reaction is readily effected by refluxing the borylating agent and hydroxyphenone, with or without solvent and/or catalyst as required. Refluxing is continued until the required amount of water when using boric acid or alcohol when using trialkyl borate is collected. Following completion of the reaction, the solvent and alcohol, if any, are removed by vacuum distillation. The borated hydroxyphenone generally is recovered as a solid and may be used as such or, when desired, the product may be retained in the solvent and used as such or the product may be prepared as a solution in a different solvent and used in this manner.

The exact structure of the borated product will vary with the particular hydroxyphenone employed, with the particular borylating agent employed, with the conditions under which the borylation is effected and whether an extraneous alcohol or mercaptan is used. For example, when the hydroxy groups are in close proximity as, for example, in 2,2′-dihydroxybenzophenone, 2,3-dihydroxyacetophenone, etc., one mole proportion of boric acid will react with the adjoining hydroxy groups to form a chelate. Accordingly, two valences of the boron are satisfied and this leaves one unsatisfied valence which may react with the extraneous alcohol or mercaptan, if employed, or with a different hydroxyphenone molecule. When the hydroxy groups of the hydroxyphenone are positioned further apart as, for example, in 2,4-dihydroxybenzophenone, 2,5-dihydroxybenzophenone, 2,6-dihydroxybenzophenone, etc., one mole proportion of boric acid will react with each hydroxy group. As hereinbefore set forth, when the reaction is effected at a higher temperature, the meta-borate is formed. When employing a trialkyl borate as the borylating agent, either complete or partial transesterification occurs, depending upon the proportions of reactants and conditions of operation.

From the above discussion, it will be seen that the exact structure of the borate may vary and also that the product may consist of a mixture of compounds. Accordingly, the additives of the present invention are being claimed generically. It is understood that the different borated compounds meeting the requirements as hereinbefore set forth may be used for the purposes of the present invention but that the different additives are not necessarily equivalent in their effectiveness in the same or different substrates.

The novel compounds of the present invention possess varied utility. They are particularly advantageous for use as additives in organic substances subject to oxidative deterioration. These compounds also serve as weathering stabilizers to protect substrates which undergo ultraviolet light-induced oxidation. Also they may serve as antimildew, fungicide, bactericide, etc., additive for organic substrates, especially fibers, cloth, paint, varnish, other coatings, fuels, etc., or as antistatic or antiblocking additives and dye sites in plastics. The substrates normally subject to exposure to weather include plastics, resins, paints, varnishes, other coatings, fibers, textiles, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, lightweight outdoor furniture, awnings, cover for greenhouses, fibers, etc. In many of these applications the solid olefin polymer is exposed to sunlight and air.

Another plastic being used commercially on a large scale is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc.

Furthermore, the additives of the present invention also may inhibit discoloration of the plastic.

Still other plastics are prepared from other monomers and are available commercially. Illustrative examples include polyurethanes, both the urethane foams and the rigid resins, epoxy resins, polycarbonates, etc. Still other illustrative examples include phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, preventing and/or retarding discoloration, rust or corrosion inhibitor, detergents, dispersing agent, etc. In gasoline, the additive improves the combustion characteristics of the gasoline.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-ditertiarybutyl-4-methylphenol. Other inhibitors which may be used generally will be of the phenolic or amine type and include phenyl-alpha-naphthylamine, phenyl-beta-naphthylamine, phenothiazine, Nonox WSP, Nonox C1, dialkylated phenols, trialkylated phenols including 2,4-dimethyl-6-tertiarybutylphenol, etc., Santonox R, Santowhite, alkyl-alkoxyphenols, 2246 [2,2'-methylene-bis-(4-methyl-6-tert-butylphenol)] and 425 [2,2'-methylene-bis-(4-ethyl-6-tert-butyphenol)], diphenyl-p-phenylenediamine, 1,1,3-tris-(2-methyl-4-hydroxy-5-t-butylphenyl)-butane, 703 (2,6-di-tert-butyl-alpha-dimethylamino-p cresol), 4,4' - bis-(2-methyl-6-tert-butylphenol); 4,4' - thio-bis-(6-tert-butyl-o-cresol); 4,4'-bis-(2,6-di-tert-butylphenol); 4,4'-methylene-bis-(2,6-di-tert-butylphenol); Salol (salicyclic acid esters), p-octyl-phenylsalicylate, various phosgene alkylated phenol reaction products, etc. Other ultraviolet light stabilizers include nickel-bis-dithiocarbamates and especially nickel-bis-dibutyldithiocarbamate, nickel-bis-dihydroxy-polyalkylphenol sulfides, especially [2,2'-thiobis-(4-t-octylphenolate)]-n-butylamine nickel (II), dilauryl beta-mercaptodipropionate, dihydroxytetralkyl sulfides, dihydroxytetralkyl methanes, various trithiophosphites as trilaurylthiophosphate, dialkylphosphites, trialkylphosphites, high molecular weight nitriles, various Mannich bases, various N-hydroxyphenylbenzotriazoles such as 2-(2'-hydroxy-5'-octylphenyl)-benzotriazole, 2-(2'-hydroxy-5'- dodecylphenyl)-benzotriazole, 2-(2'-hydroxy-5'-octoxyphenyl)-benzotriazole, 2-(2'-hydroxy-5'-dodecoxyphenyl)-benzotriazole, Tinuvin 326, etc., in general, any alkyl or alkoxyphenyl substituted benzotriazole, etc. The additional inhibitor may be used in a concentration of from about 1% to about 200% by weight and generally from about 10% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stablizing concentration which will depend upon the particular substrate. The additive may be used in a concentration as low as 0.0001% to about 25%, but generally will be used in a concentration of from about 0.01% to about 5% by weight of the substrate. When used in hydrocarbon distillate and particularly gasoline, the additive generally is used in a concentration of from about 0.0001% to about 0.5%. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

The compound of this example was prepared by the reaction of two mole proportions of 2,2'-dihydroxy-4-octoxybenzophenone with one mole proportion of boric acid. The 2,2'-dihydroxy-4-octoxybenzophenone is available commercially. The reaction was effected by refluxing 68.4 g. (0.2 moles) of 2,2'-dihydroxy-4-octoxybenzophenone and 6.18 g. (0.1 mole) of boric acid in the presence of 100 g. of benzene. Refluxing was continued for about 6 hours, the temperature reaching 94° C. A total of 4.5 cc. of water was collected. Following completion of the reaction, the reaction mixture was dissolved in benzene, treated with charcoal and filtered. The product was recovered as a solid and found by analysis to contain 1.74% by weight of boron which corresponds to the theoretical boron concentration of 1.56% for the reaction product in which two valences of the boron are satisfied by the hydroxy groups to form a chelate.

EXAMPLE II

The compound of this example was prepared by the reaction of equal mole proportions of 2,2'-dihydroxy-4-octoxy-benzophenone with boric acid. The reaction was effected by refluxing 68.4 g. (0.2 mole) of 2,2'-dihydroxy-4-octoxy-benzophenone and 12.37 g. (0.2 mole) of boric acid in the presence of 100 g. of benzene. The refluxing was continued for about 16 hours, after which time a total of 7.5 cc. of water was collected. Following completion of the reaction, the reaction mixture was filtered to remove a small amount of insoluble material. The benzene-soluble filtrate then was distilled to remove the benzene. The product then was purified by treating with a hexane fraction, after which the solid was separated and dried overnight. The product was recovered as a solid having a melting point of greater than 90° C. Analysis of the product showed a boron content of 3.74% by weight which corresponds to a boron content of 3.05% by weight for the bi-substituted derivative.

EXAMPLE III

The compound of this example was prepared by reacting 3 mole proportions of 2-hydroxy-4-octoxybenzophenone with 1 mole proportion of boric acid. This preparation was made by refluxing 97.8 g. (0.3 mole) of 2-hydroxy-4-octoxybenzophenone and 6.80 g. (0.1 mole plus 10% excess) of boric acid in 200 g. of benzene. Refluxing was continued for about 16 hours and a total of 3 cc. of water was collected. Following completion of the reaction, the reaction mixture was filtered to remove any unreacted materials, and the benzene solvent then was removed by distillation under water pump vacuum. The product was recovered as a white solid having a melting point of 46–51° C. Analysis showed a boron content of 1.23% by weight which corresponds to the theoretical boron content of 1.09% by weight for the compound in which 1 mole of boric acid reacts with 3 moles of the hydroxybenzophenone.

EXAMPLE IV

Another preparation similar to that described in Example III was made except that 2 moles of 2-hydroxy-4-octoxybenzophenone and 1 mole of boric acid were used. This reaction was effected by refluxing 65.2 g. (0.2 mole) of 2-hydroxy-4-octoxybenzophenone and 6.18 g. (0.1 mole) of boric acid in 100 g. of benzene. Refluxing was continued for about 13 hours and a total of 5.2 cc. of water was collected. The reaction mixture was refluxed further but no additional water was collected. Following completion of the reaction, the reaction mixture was dissolved in benzene, filtered, distilled at 100° C. under water pump vacuum to remove the benzene, washed with hexane fraction and then digested with a heptane fraction in order to purify the product. The solid product had a boron content of 6.41% by weight and is believed to be a mixture of borated compounds including a polycyclic structure joined by a —B—O—B— linkage, complex containing meta-borate or other reaction products.

EXAMPLE V

The compound of this example was prepared by reacting one mole proportion of 2,2'-dihydroxy-4-octoxybenzophenone with one mole proportion of boric acid and then with one mole proportion of n-butanol. The reaction was effected by refluxing 34.2 g. (0.1 mole) of 2,2'-dihydroxy-4-octoxybenzophenone with 6.18 g. (0.1 mole) of boric acid in the presence of 100 g. of benzene. Refluxing was continued for about 12 hours, during which time a total of 4.5 cc. of water was collected. Then 7.5 g. (0.1 mole) of n-butanol was added and the mixture was refluxed for about 12 hours, during which time a total of 0.3 cc. of water was collected. The product was filtered and distilled under water pump vacuum to remove the benzene. The product was recovered as a solid having a boron content of 2.31% by weight which corresponds to a theoretical boron content of 2.156% by weight for the compound in which two valences of the boron are satisfied by the hydroxy groups of the phenone and one valence of the boron would be satisfied by the butanol.

EXAMPLE VI

The compound of this example is prepared by reacting 2-hydroxyacetophenone with tri-n-butyl borate. This is a transesterification reaction and is effected by heating and refluxing 3 mole proportions of 2-hydroxyacetophenone and 1 mole proportion of tri-n-butyl borate at a temperature of about 140° C. in the presence of xylene solvent. The refluxing is continued until the required amount of butanol is collected, the butanol resulting from the transesterification reaction. Following completion of the reaction, the reaction mixture is worked up in substantially the same manner as hereinbefore set forth and the product is recovered in solution in the xylene and used in this manner.

EXAMPLE VII

The compound of this example is prepared by refluxing equal mole proportions of 2'-hydroxycyclohexylphenone, which also may be named 1,2,3,4,5,6-hexahydro-2'-hydroxybenzophenone, and boric acid in the presence of benzene solvent. The refluxing is continued until the desired amount of water is collected, after which the reaction mixture is filtered to remove any solids, vacuum distilled to remove the benzene solvent, and the 2'-hydroxycyclohexylphenone is recovered.

EXAMPLE VIII

The compound of this example is prepared by the reaction of resacetophenone with boric acid. The reaction is effected by refluxing one mole proportion of resacetophenone with 2 mole proportions of boric acid in the presence of xylene solvent. The refluxing is continued until the desired amount of water is collected, after which the product is worked up in substantially the same manner as hereinbefore described to recover the borated product.

EXAMPLE IX

As hereinbefore set forth the compound of the present invention is useful as an antioxidant in plastic. The plastic of this example is solid polypropylene. The solid polypropylene without inhibitor is stated to have properties substantially as follows:

TABLE I

| | |
|---|---|
| Specific gravity | 0.910–0.920 |
| Refractive index, $nD^{25}$ | 1.510 |
| Heat distortion temperature: | |
|   At 66 p.s.i. load, ° C. | 116 |
|   At 264 p.s.i. load, ° C. | 66 |
| Tensile yield strength, p.s.i. (ASTM D–638–58T) (0.2″ per min.) | 4700 |
| Total elongation, percent | 300–400 |
| Stiffness flexural (ASTM D747–50) $10^5$ p.s.i. | 1.8 |
| Shore hardness (ASTM D676–55T) | 74 |

The additive when employed was incorporated into the sample of the polypropylene by milling. The sample of the polypropylene was evaluated in a method similar to that described by Hawkins, Hansen, Matreyek and Winslow in Rubber Chemistry and Technology, October-November, 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, a control sample of the polypropylene without additive had an Induction Period of 4¼ hours. Another sample of the polypropylene containing 1% by weight of the borate of 2,2'-dihydroxy-4-octoxybenzophenone, prepared as described in Example I, and 0.15% by weight of 2,6-ditertbutyl-4-methylphenol was evaluated in the same manner and the Induction Period was increased to 1750 hours.

It is believed that the use of the borate in admixture with the 2,6-ditertbutyl-4-methylphenol results in a synergistic effect and increases the Induction Period even more than obtained by the borate alone. The 2,6-ditertbutyl-4-methylphenol, when used alone and evaluated in the above manner, was of substantially no effect in increasing the Induction Period of the polypropylene.

EXAMPLE X

The borate of 2-hydroxy-4-octoxybenzophenone, prepared as described in Example IV, also was evaluated in another sample of the polypropylene described in Example IX and in the same manner as described therein. The borate was used in a concentration of 1% by weight in admixture with 0.15% by weight of 2,6-ditertbutyl-4-methylphenol. When evaluated in this manner, the Induction Period of the polypropylene was increased from 4¼ hours to over 500 hours.

For comparative purposes, another run was made in the same manner as described above in which the polypropylene contained 1% by weight of 2-hydroxy-4-octoxybenzophenone and 0.15% by weight of 2,6-ditertbutyl-4-methylphenol. When evaluated in the same manner, the Induction Period was increased to less than 21 hours. This directly compares the results obtained when using the borate and the results obtained when using the benzophenone itself, both of the runs being made in admixture with the 2,6-ditertbutyl-4-methylphenol.

In this particular polypropylene, the borate of 2-hydroxy-4-octoxybenzophenone was not as potent as the borate of 2,2'-dihydroxy-4-octoxybenzophenone. Accordingly, in such polypropylene, it is preferred that the borate of the 2,2'-dihydroxy-4-octoxybenzophenone be used.

EXAMPLE XI

Samples of the polypropylene described in Example IX also were evaluated in the Fadeometer. A batch of the polypropylene free of inhibitor is pressed into sheets of about 17 mil. thickness and cut into plaques of about 1⅜ by 1½ inches. When employed, the additive is incorporated in the polypropylene prior to pressing into sheets. The plaques are inserted into plastic holders, affixed onto a rotating drum and exposed to carbon arc rays at about 52° C. in the Fadeometer. The samples are examined periodically by infrared analysis to determine the carbonyl band at 1715 cm.$^{-1}$, which is reported as the "carbonyl number." The higher intensity of the carbonyl band indicates a higher carbonyl concentration (expressed as carbonyl number) and, accordingly, increased deterioration.

A sample of the polypropylene without additive reached a carbonyl number of 1000 in less than 48 hours. In contrast, a sample of the polypropylene containing 1% by weight of the borate of 2,2'-dihydroxy-4-octoxybenzophenone, prepared as described in Example I, and 0.15% by weight of 2,6 - ditertbutyl - 4 - methylphenol, did not reach a carbonyl number of 1000 until over 1440 hours.

EXAMPLE XII

The plastic of this example is solid polyethylene of the high density type. An inhibited product of this polyethylene is marketed commercially under the trade name of "Fortiflex" for the Celanese Corporation of America. Samples of the polyethylene are pressed into plaques and evaluated in the Fadeometer in the same manner as described in Example XI. The additive of this example is the borate of 2-hydroxy-4-octoxybenzophenone, prepared as described in Example III, and is incorporated in a concentration of 1% by weight in otherwise uninhibited samples of the polyethylene prior to pressing into sheets. This serves to stabilize the polyethylene and to considerably increase the time before a carbonyl number of 1000 is reached.

EXAMPLE XIII

The plastic of this example is polystyrene. During milling of the polystyrene 1% by weight of the borate of 2-hydroxyacetophenone, prepared as described in Example VI, is incorporated in the polystyrene. This serves to inhibit deterioration of the polystyrene upon exposure to weathering.

EXAMPLE XIV

The borate of 2'-hydroxycyclohexylphenone, prepared as described in Example VII, is utilized as an inhibitor in polyvinyl chloride plastic. The additive is incorporated by partly melting the polyvinyl chloride plastic and adding the inhibitor into the hot melt in a concentration of 0.75% by weight. This serves to inhibit deterioration of the polyvinyl chloride plastic upon exposure to oxygen.

EXAMPLE XV

This example describes the use of the additive of the present invention in grease. In this example, the borate of 2,2'-dihydroxy-4-octoxybenzophenone, prepared as described in Example I, is incorporated in a concentration of 0.3% by weight in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently, the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.3% by weight of the borate of the present invention will not reach the Induction Period until more than 100 hours when evaluated in the above manner.

EXAMPLE XVI

This example describes the use of the additive of the present invention in synthetic lubricating oil. The synthetic lubricating oil is dioctyl sebacate and is marketed under the trade name of "Plexol." The additive is the borate of 2,2'-dihydroxy-4-octoxybenzophenone, prepared as described in Example I, and is incorporated in a concentration of 1% by weight in the synthetic lubricating oil with intimate mixing. This serves to prevent oxidative deterioration of the lubricating oil.

I claim as my invention:
1. Boron acid ester of a hydroxyphenone of the following general formula

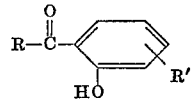

where R is selected from the group consisting of phenyl, alkyl of from 1 to 16 carbon atoms, and cycloalkyl of from 3 to 12 carbon atoms in the ring, and R' is selected from the group consisting of hydrogen, alkyl of from 1 to 30 carbon atoms, cycloalkyl containing from 3 to 12 carbon atoms in the ring, hydroxy, alkoxy of from 1 to 30 carbon atoms, monocyclic aryloxy and cycloalkoxy containing from 3 to 12 carbon atoms in the ring.

2. Boron acid ester of hydroxybenzophenone having a hydroxy group in the 2-position.

3. Boron acid ester of 2-hydroxybenzophenone.

4. Boron acid ester of 2,2'-dihydroxybenzophenone.

5. Boron acid ester of 2,2'-dihydroxy-4-alkoxybenzophenone in which the alkoxy contains from 1 to 20 carbon atoms.

6. Boron acid ester of 2,2'-dihydroxy-4-octoxybenzophenone.

7. Boron acid ester of 2-hydroxyacetophenone.

8. Boron acid ester of 1,2,3,4,5,6-hexahydro-2-hydroxybenzophenone.

References Cited

UNITED STATES PATENTS

| | | | |
|---|---|---|---|
| 2,260,336 | 10/1941 | Prescott et al. | 260—462 |
| 2,276,094 | 3/1942 | Rothrock | 260—80 |
| 2,899,470 | 8/1959 | Goldstein | 260—624 |

CHARLES B. PARKER, *Primary Examiner.*

L. C. MARUZO, *Assistant Examiner.*